United States Patent [19]

Cenci et al.

[11] 4,115,637

[45] Sep. 19, 1978

[54] METHOD FOR CURING POLYMERS CONTAINING HYDROXYALKYLAMIDE GROUPS BY MEANS OF NONPOLYMERIC POLYCARBOXYLIC ACIDS, AND COMPOSITIONS

[75] Inventors: Harry J. Cenci, Warminster; Graham Swift, Bluebell, both of Pa.

[73] Assignee: Rohm and Haas Company, Philadelphia, Pa.

[21] Appl. No.: 712,552

[22] Filed: Aug. 9, 1976

Related U.S. Application Data

[63] Continuation-in-part of Ser. No. 454,645, Mar. 25, 1974, abandoned.

[51] Int. Cl.$^2$ .............................. C08J 3/24; C08J 5/12; C08K 5/12
[52] U.S. Cl. ................................. 526/56; 260/29.4 R; 260/30.8 DS; 260/31.2 N; 260/33.2 R; 260/33.4 R; 260/33.6 UA; 260/33.8 UA; 428/542; 526/15
[58] Field of Search .............. 526/56, 15; 260/29.4 R, 260/29.4 UA, 30.8 DS

[56] References Cited

U.S. PATENT DOCUMENTS

| | | | |
|---|---|---|---|
| 3,108,992 | 10/1963 | Moore et al. | 526/56 |
| 3,457,209 | 7/1969 | Mikofalvy | 260/29.6 TA |
| 3,466,266 | 9/1969 | Nagata et al. | 526/56 |
| 3,585,172 | 6/1971 | Nishiyama et al. | 526/49 |
| 3,652,501 | 3/1972 | Albers et al. | 260/75 N |
| 3,759,915 | 9/1973 | Kottke | 260/41 R |
| 3,947,528 | 3/1976 | Wingler et al. | 260/901 |

FOREIGN PATENT DOCUMENTS

1,068,037  5/1967  United Kingdom.
1,366,081  9/1974  United Kingdom.

*Primary Examiner*—John Kight, III

[57] ABSTRACT

β-Hydroxyalkylamide polymers are disclosed as curable by nonpolymeric compounds having carboxy or anhydride functions. The β-hydroxyalkylamide polymers are prepared either from known compounds or may be prepared by treating an ester group with an appropriately substituted amine. The polymers are useful in organic solvent solution, aqueous systems, and powder coating formulations.

26 Claims, No Drawings

METHOD FOR CURING POLYMERS CONTAINING HYDROXYALKYLAMIDE GROUPS BY MEANS OF NONPOLYMERIC POLYCARBOXYLIC ACIDS, AND COMPOSITIONS

This is a continuation-in-part of Ser. No. 454,645, filed Mar. 25, 1974, the specification of which is incorporated herein by reference, and is related to other continuation-in-part applications thereof. The claimed subject matter is divided from that of Ser. No. 454,645, now abandoned, wherein a restriction requirement was made. The related applications are Ser. Nos. 686,004; 713,081; and 712,553, filed May 13, 1976, Aug. 9, 1976, and Aug. 9, 1976, respectively.

This invention relates to a novel method for curing or crosslinking polymers having β-hydroxyalkylamide groups, by reacting nonpolymeric polycarboxylic acids therewith.

The polycarboxylic acids employed in this invention are efficient curing agents for β-hydroxyalkylamide containing polymers and can be employed without any catalyst being required, although added basic catalysts may be used. In addition, the β-hydroxyalkylamide polymers are usable in a wide range of liquids including water. Water is especially desirable because it eliminates the necessity of employing even relatively nontoxic organic solvents which may prove harmful when employed over a long period of time. Furthermore, structural variations of the β-hydroxyalkylamide groups are relatively simple to attain so that one can obtain optimum crosslinking efficiency.

The curable polymers can be prepared by copolymerizing a β-hydroxyalkylamide of the formula:

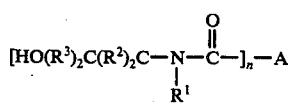

wherein A is an unsaturated alkyl radical which contains from 1 to 60 carbon atoms, such as an unsaturated radical containing one or more ethylenic groups [>C=C<] such as ethenyl, 1-methylethenyl, 3-butenyl-1,3-diyl, 2-propenyl-1, 2-diyl, carboxy lower alkenyl, such as 3-carboxy-2-propenyl and the like, lower alkoxy carbonyl lower alkenyl such as 3-methoxy-carbonyl-2-propenyl and the like; $R^1$ is hydrogen, lower alkyl of from 1-5 carbon atoms such as methyl, ethyl, n-propyl, n-butyl, sec-butyl, tert-butyl, pentyl and the like or hydroxy lower alkyl of from 1-5 carbon atoms such as hydroxyethyl, 3-hydroxypropyl, 2-hydroxypropyl, 4-hydroxybutyl, 3-hydroxy-butyl, 2-hydroxy-2-methylpropyl, 5-hydroxypentyl, 4-hydroxy-pentyl, 3-hydroxypentyl, 2-hydroxypentyl and the isomers of pentyl; $R^2$ and $R^3$ are the same or different radicals selected from hydrogen, straight or branched chain lower alkyl of from 1-5 carbon atoms or one of the $R^2$ and one of the $R^3$ radicals may be joined to form, together with the carbon atoms, cycloalkyl such as cyclopentyl, cyclohexyl and the like; and n is an integer having a value of 1 or 2.

Other hydroxyalkylamide monomers may be used as long as the resulting polymer contains units of the formula:

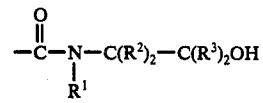

wherein $R^1$, $R^2$, and $R^3$ have the meanings given above. Preferably, the formula is:

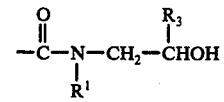

wherein $R^3$ is alkyl having 1-5 carbon atoms, preferably 1 carbon atom. Where $R^1$ is hydroxyalkyl, it is preferably the same as the hydroxyalkyl depicted. For instance, ethylenically unsaturated addition polymerizable monomers may be used which have the formula:

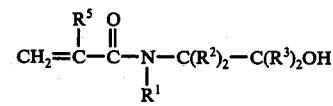

wherein $R^1$, $R^2$, and $R^3$ are as described above, and $R^5$ is -H or -CH$_3$. It is preferred that such monomers are copolymerized by addition polymerization in minor amounts of 1% to 50%, preferably 1% to 20%, of the total weight of ethylenically unsaturated monomers. The monomers (V) can be prepared in a manner analagous to that for preparing the monomers (I).

Suitable monomers utilized in a major proportion, i.e., over 50%, to prepare the addition copolymer may be represented by the following formula:

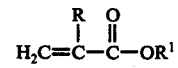

wherein R is H or alkyl having 1 to 4 carbon atoms and $R^1$ is the straight chain or branched chain radical of a primary or secondary alkanol, alkoxyalkanol or alkylthiaalkanol, the alkanol having from 1 to about 20 carbon atoms, examples being methylethyl, methylpropyl, n-butyl, 2-ethylhexyl, heptyl, hexyl, octyl, propyl, 2-methylbutyl, 1-methylbutyl, butoxybutyl, 2-methylpentyl, methoxymethyl, ethoxyethyl, cyclohexyl, n-hexyl, isobutyl ethylthiaethyl, methylthiaethyl, ethylthiapropyl, n-octyl, 6-methylnonyl, decyl, dodecyl, and the like. Also useful are an amide-containing monomer such as acrylamide, methacrylamide, or the methylol or methoxymethylol derivatives thereof, or a hydroxyl-containing monomer such as hydroxyethyl or hydroxypropyl acrylate or methacrylate. The hydroxyl-containing and amide-containing monomers may be used together, or singly. Other conventional addition polymerizable ethylenically unsaturated monomers include styrene, vinyl toluene, vinyl acetate, butadiene, and so forth.

Suitable curable polymers are those containing monomer residues of the foregoing formula I, wherein $R^1$ is H, lower alkyl, or HO(R$^3$)$_2$C(R$^2$)$_2$C-, n is 2, A has 2-8 carbon atoms each $R^2$ is H, and one of the $R^3$ radicals in each case is H and the other is H or a C$_1$-C$_5$ alkyl; that is,

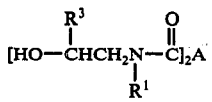

wherein A, $R^1$, $R^3$, and n have the meanings just given. Examples of the most preferred compounds fall within the formula:

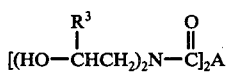

wherein $R^3$ limited to H in both cases, or —$CH_3$ in both cases.

Specific examples falling within formula Ib are bis[N,N-di($\beta$-hydroxyethyl)] maleamide, bis[N,N-di($\beta$-hydroxypropyl)] fumaramide, bis[N,N-di($\beta$-hydroxyethyl)] citraconamide, bis[N,N-di($\beta$-hydroxypropyl)] maleamide, and bis[N-methyl-N-($\beta$-hydroxyethyl)] mesaconamide. Such bis-amides can have as the unsaturated moiety A, the residue of various unsaturated polycarboxylic acids.

As exemplary of such polycarboxylic unsaturated aliphatic acids, their anhydrides or chlorides suitable for use in the preparation of the hydroxyamides to be employed in this invention there may be mentioned the following: maleic acid, maleic anhydride, fumaric acid, itaconic acid, itaconic anhydride, citraconic acid, glutaconic anhydride, dimethyl citraconic acid, dimethyl mesaconic acid, dimethyl itaconic acid, dimethyl itaconic acid, mesaconic acid, hexene-(2)-dicarboxylic acid, hexene-(3)-dicarboxylic acid, $\beta$-methyl glutaconic acid (cis and trans), $\beta$-methyl glutaconic acid (cis and trans), ethyl maleic acid, ethyl fumaric acid, $\nu$-methyl itaconic acid, $\beta$-methyl itaconic acid, dimethyl maleic acid, dimethyl fumaric acid, transethyl mesaconic acid, $\delta$-hexylene $\alpha,\delta$-dicarboxylic acid, $\nu$-propyl itaconic acid, $\beta$-propyl glutaconic acid, $\Gamma$-n-hexyl itaconic acid, fumaryl chloride, and mixtures thereof. Preferred are maleic, fumaric, itaconic, glutaconic, mesaconic, and citraconic acids.

The $\beta$-hydroxyalkylamides (I, supra) are either known compounds or may be prepared by treating an ester of formula II (infra) of such unsaturated acid with an amine of formula III (infra) at a temperature in the range of from about ambient up to about 200° C. Optionally, a catalyst may be employed, for example, potassium methoxide or butoxide and the like; quaternary ammonium alkoxides, such as tetramethylammonium methoxide and the like; alkali metal and quaternary ammonium hydroxides at an amount in the range of from 0.1 to 1.0 wt. % based on the weight of the ester. The reaction is preferably conducted at elevated temperatures. The following equation illustrates this process:

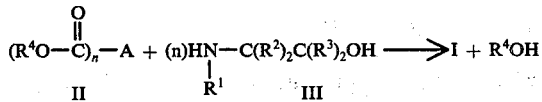

wherein A, $R^1$, $R^2$, $R^3$, and n are as defined above and $R^4$ is lower alkyl of from 1–5 carbon atoms such as methyl, ethyl, propyl, n-butyl, tert-butyl, pentyl and the like.

The esters (II, supra) employed above are either known compounds or are prepared by esterifying the corresponding polycarboxylic unsaturated aliphatic acid by standard esterifying procedures well known to those skilled in the art.

When "A" is the residue of an unsaturated dicarboxylic acid such as maleic acid, the acid chlorides or anhydrides can be used, as follows:

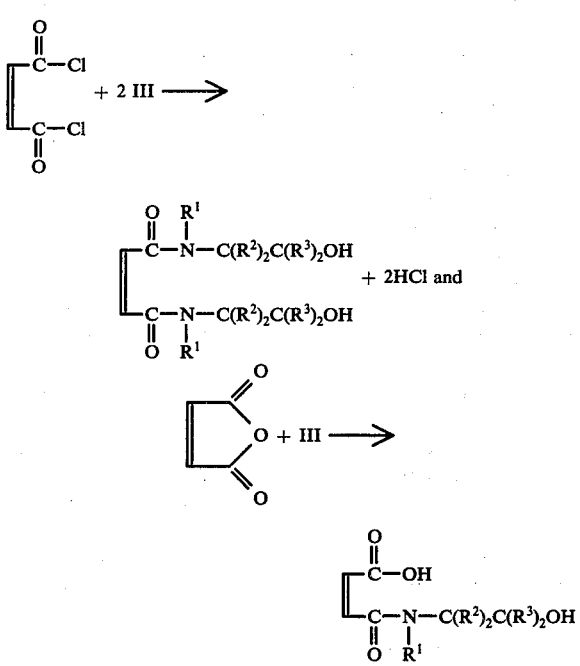

The latter is an example of a half-amide.

Some representative examples of the amines falling within formula III which can be employed include 2-aminoethanol; 2,methylaminoethanol; 2-ethylaminoethanol; 2-n-propylaminoethanol; 2,2'-iminodiethanol; 2-aminopropanol; 2,2'-iminodiisopropanol; 2-aminocyclohexanol; 2-aminocyclopentanol; 2-aminomethyl-2-methylethanol; 2-n-butylaminoethanol; 2-methylamino-1,2-dimethylethanol; 2-amino-2methyl-1-propanol; 2-amino-2-methyl-1,3-propanediol; 2-amino-2-ethyl-1,3-propanediol and 2-amino-2-hydroxymethyl-1,3-propanediol.

To cause curing of the $\beta$-hydroxyalkylamide polymer it is mixed with a nonpolymeric polybasic acid at a ratio of from about 0.1 to about 2 parts of hydroxy functions per one part of carboxy function, a 1:1 ratio of carboxy to hydroxy function being preferred, and the curing reaction is subsequently carried out. Ratios outside of the above ranges may be employed but crosslinking efficiency is reduced.

As noted above, the relative amounts of carboxy and hydroxyamide functionalities in the curable mixture may be stoichiometric, although one or both may be present as free hydroxyl and/or free carboxy groups. For example, if an excess of the nonpolymeric polycarboxylic compound is used in an amount greater than needed to react with most or all of the pendant hydroxyamide groups, the cured polymer will contain pendant unreacted carboxylic groups. For use with solution polymers, the crosslinker is dissolved directly into the polymer solution with or without a solvent. Solvents or dispersing media which may be employed to carry the curable mixture include aromatics, such as toluene, xylene and the like; aliphatics such as heptane, octane and the like; water, dimethylformamide, dimethylsulfoxide, also halogenated solvents, ethers, esters and alcohols, depending on the solubility of particular crosslinkers. When films are cast or spray applied from aqueous systems, the pollution of the atmosphere which occurs when organic solvents are employed is eliminated. This advantage is important even when preparing powder coatings since no special precautions need be taken with regard to the aqueous solvent. To prepare powder coatings, aqueous formulations such as described for emulsion or solution polymers or solutions in organic solvents suitable for freeze drying, such as dioxane and benzene, or spray drying, e.g., toluene or methylene chloride, are employed and the powder coating isolated by freeze drying or spray drying.

The polymer containing the $\beta$-hydroxyalkylamide is cured by reacting it with the nonpolymeric polybasic acid by heating the mixture at a temperature in the range of from 125° to about 400° C. and preferably in the range of from 125° to 175° C. for a period of time in the range of from about 0.5 to about 30 minutes. It is not necessary to employ a catalyst to effect curing.

Representative saturated nonpolymeric polybasic acids or aromatic polybasic acids, preferably the dibasic acids, or anhydrides thereof having no polymerizable double bonds, are:

| | |
|---|---|
| adipic | malonic |
| sebacic | pimelic |
| suberic | undecanedioic |
| azelaic | terephthalic |
| i-phthalic | naphthalic |
| o-phthalic | diphenyl-o,o'-dicarboxylic |
| oxalic | tetrachlorophthalic |
| succinic | tetrahydrophthalic |
| 1,1,3-trimethyl-5-carboxy-3-(p-carboxyphenyl)indan | tetrabromophthalic |
| glutaric | 1,4-cyclohexanedioic |
| 1,2,4,5-benzene tetracarboxylic | | or any other polycarboxylic acid free of polymerizable (i.e., olefinic) unsaturation desirably having up to 60 carbon atoms, and mixtures thereof. Also there may be employed dimer and trimer acids and mixtures thereof prepared by the polymerization of $C_{18}$ fatty acids such as a dimer acid with 2 carboxy groups, 36 carbon atoms and an approximate molecular weight of 565 or a trimer acid with 3 carboxy groups, 54 carbon atoms and an approximate molecular weight of 850. It is to be understood that such dimer and trimer acids are nonpolymeric as the term is used herein. Of course, under suitable conditions, it is to be understood that the salts with fugitive bases such as volatile amines or anhydrides of such acids are equivalent thereto. As may be noted from the foregoing and from the examples, particularly useful curable polymers are ones which are free of polymerized carboxylic acid monomers.

Polymers containing the $\beta$-hydroxyalkylamides can be used in crosslinked coatings including general purpose industrial coatings, machinery and equipment coatings, especially metal coatings, such as for cans, appliances, automobiles and the like. In addition, the polymers can be used in forming films, fibers, paints, lacquers, varnishes, seamless flooring, caulks, impregnants or adhesives for both natural and synthetic materials, such as paper, textiles, wood, plastics, metal and leather; as binders for non-woven fabrics, in the preparation of inks and in all areas where epoxy and melamine finishes are presently employed.

The following examples illustrate the invention:

EXAMPLE 1—
N-methyl-N-($\beta$-hydroxyethyl)methacrylamide

Methyl methacrylate (20 g., 0.2 m.) 2-methylaminoethanol (15 g., 0.2 m.), toluene (35.7 g.) and methyl ethyl hydroquinone (MEHQ) (0.1 g.) are mixed under a nitrogen atmosphere in a flask equipped with a condenser, stirrer and thermometer. Sodium methoxide/methanol (4.0 g.) is added rapidly and the reaction temperature maintained at 20° C. by external cooling. The reaction is complete in 30 minutes as indicated by the residual base titration reaching a minimum. The crude product is treated with an excess of strong acid ion exchange resin (Amberlyst ® 15) to remove basic materials. The ion exchange resin is removed by filtration and the toluene removed under vacuum to afford 20 g. of N-methyl-N-($\beta$-hydroxyethyl)methacrylamide, b.p. 120°-122° C./0.5 mm.

Elemental Analysis for $C_7H_{13}NO_2$ $_{Calcd. C,}$ 58.8; H, 9.1; N, 9.7; O, 22.4 Found: C, 59.2; H, 9.1; N, 8.9; O, 22.8

EXAMPLE 2 —
Bis[N,N-($\beta$-hydroxyethyl)]methacrylamide

To a flask equipped with a stirrer, nitrogen bleed, thermometer and condenser is added methyl methacrylate (100 g., 1m.), diethanolamine (105 g., 1m.), tert-butanol (175 g.) and MEHQ (0.2 g.). Sodium methoxide/methanol (18.5 g., 25 weight %) is then added rapidly and the temperature maintained below 25° C. by external cooling. After 90 minutes, 76% of the base charge is consumed. The product is isolated as described above in Example 1. Infrared analysis and nuclear magnetic resonance data are consistent with the assigned structure.

EXAMPLE 3—
Preparation of polymer containing methyl methacrylate (MMA) butyl acrylate (BA) and N-methyl-N-($\beta$-hydroxyethyl) methacrylamide (MHEMAM)

A. Preparation of
MMA/BA/MHEMAM//73.4/19.6/7.0 wt.%

| Charge | Grams |
|---|---|
| Initiator and Monomer Mix | |
| MMA | 734 |
| BA | 196 |
| MHEMAM | 70 |
| Toluene | 168.8 |
| n-propyl acetate | 168.8 |
| 2,2'-azobisisobutyronitrile (AIBN) | 7.5 |
| Heel Charge | |
| Toluene | 375 |
| n-propyl acetate | 375 |
| First Chaser | |
| Toluene | 168.8 |
| n-propyl acetate | 168.8 |
| (AIBN) | 0.75 |
| Second Chaser | |
| Toluene | 37.5 |
| n-propyl acetate | 37.5 |
| (AIBN) | 0.75 |

Procedure: The heel charge is added to a kettle fitted with stirrer, condenser, nitrogen inlet and addition funnel. The mixture is heated to reflux (100° C.). At reflux, the initiator and monomer mix is added over 2.5 hours, first while maintaining reflux and a nitrogen blanket.

The first chaser catalyst is then added over one hour and held for one-half hour. The second chaser catalyst is then added over one-half hour and held for 1 hour. The mixture is then cooled and the reaction terminated.

EXAMPLE 4

Example 3 is repeated, but bis[N,N-(β-hydroxyethyl)]-methacrylamide is used in place of MHEMAM.

EXAMPLE 5

The polymer solutions of Examples 3 and 4 are mixed, respectively with adipic acid and glutaric acid, the hydroxy and carboxy groups being present in equivalent amounts, and the solutions cast as 10 mil thick films on Alodyne aluminum sheet. The films are dried for one hour at about 100° C. and then heated at 175° C. for 1 hour, to give hard coatings insoluble in n-propyl acetate. When the polymer solutions are used in the same way but without the polycarboxylic acid crosslinker, the films are soluble in n-propyl acetate.

We claim:

1. A method of curing addition polymers containing two or more pendant β-hydroxyalkyl amide groups of the formula:

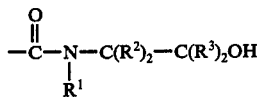

IV wherein $R^1$ is hydrogen, or alkyl having 1 to 5 carbon atoms, or hydroxyalkyl having from 1 to 5 carbon atoms; $R^2$ and $R^3$ are the same or different radicals selected from hydrogen, straight or branched chain alkyl having from 1 to 5 carbon atoms, or one of the $R^2$ and one of the $R^3$ radicals joined together with the carbon atoms to which they are attached form cycloalkyl, which comprises the steps of (1) mixing said polymer with a nonpolymeric polycarboxylic acid free of polymerizable unsaturation or a mixture of such acids, and (2) reacting the acid and polymer by heating the mixture at a temperature of from about 125° to 400° C. until the cured polymer is obtained.

2. A method according to claim 1 wherein the β-hydroxyalkylamide groups are present in a minor proportion in an addition copolymer and have the formula:

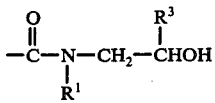

IVa wherein $R^1$ is hydrogen, alkyl having 1 to 5 carbon atoms, or hydroxyalkyl having 1 to 5 carbon atoms, and $R^3$ is selected from hydrogen and straight or branched chain lower alkyl radicals having from 1 to 5 carbon atoms.

3. The method of claim 2 in which $R^1$ is —CH$_2$-CHOH and $R^3$ is H or CH$_3$, and the monomer incorporating said hydroxyalkylamide groups in said addition polymer is between 1% and 20% by the total monomers utilized.

4. The method of claim 3 in which the nonpolymeric polycarboxylic acid is a dicarboxylic acid having up to 20 carbon atoms, or a mixture of such acids.

5. The method of claim 4 in which said nonpolymeric acid is an aliphatic acid free of olefinic unsaturation, or a mixture of such aliphatic acids, said polymer being free of polymerized carboxylic acid monomers.

6. The method of claim 4 in which the ratio of carboxy functional groups to hydroxy functional groups is between 0.5 to about 2 parts of hydroxy function per 1 part of carboxy function, and the curing temperature is in the range of 125° to 175° C.

7. The method of claim 5 in which the proportions are such that the ratio of hydroxy to carboxy functions is between 0.5:1 and 2:1, and the curing temperature is in the range of about 125° to 175° C.

8. The method of claim 6 wherein a liquid selected from aromatic or aliphatic compounds, water, dimethyl formamide, dimethyl sulfoxide, ethers, esters or alcohols is employed as the medium for carrying the mixture.

9. The method of claim 7 wherein a liquid selected from aromatic or aliphatic compounds, water, dimethyl formamide, dimethyl sulfoxide, or ethers, esters and alcohols is employed as the medium for carrying the mixture.

10. The method of claim 8 wherein the liquid is water.

11. A curable composition containing a mixture of (a) a nonpolymeric polycarboxylic acid, or a mixture of such acids with (b) a polymer containing pendant β-hydroxyalkylamide groups of the formula:

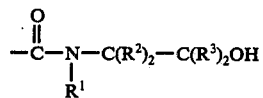

IV wherein $R^1$ is hydrogen or alkyl having 1 to 5 carbon atoms, or a hydroxyalkyl having from 1 to 5 carbon atoms; $R^2$ and $R^3$ are the same or different radicals selected from hydrogen, straight or branched chain or alkyl having from 1 to 5 carbon atoms, or one of the $R^2$ and one of the $R^3$ radicals joined together with the carbon atoms to which they are attached to form cycloalkyl.

12. A composition according to claim 11 wherein the pendant β-hydroxyalkylamide groups are present in a minor proportion in addition copolymer, and having the formula:

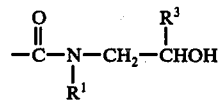

IVa wherein $R^1$ is hydrogen, alkyl having 1 to 5 carbon atoms, or hydroxyalkyl having 1 to 5 carbon atoms and $R^3$ is selected from hydrogen, and straight or branched chain lower alkyl radicals having from 1 to 5 carbon atoms.

13. The composition of claim 12 in which $R^1$ is —CH$_2$-CHOH and $R^3$ is H or CH$_3$, and the monomer incorporating said hydroxyalkylamide groups in said addition polymer is between 1% and 20% by the total monomers utilized.

14. The composition of claim 13 in which the polycarboxylic acid is a dicarboxylic acid having up to 20 carbon atoms, said polymer being free of polymerized carboxylic acid monomers.

15. The composition of claim 14 in which said acid is an aliphatic acid, or a mixture of aliphatic acids.

16. The composition of claim 14 in which the ratio of hydroxy to carboxy functions is between 0.5:1 and 2:1.

17. The composition of claim 15 in which the hydroxy to carboxy groups are present in a ratio between 0.5:1 and 2:1.

18. The composition of claim 16 containing a liquid selected from aromatic or aliphatic compounds, water, dimethyl formamide, dimethyl sulfoxide, ethers, esters and alcohols is the medium in which the composition is carried.

19. The composition of claim 17 containing a liquid selected from aromatic or aliphatic compounds, water, dimethyl formamide, dimethyl sulfoxide, ethers, esters and alcohols.

20. The composition of claim 18 wherein the liquid is water.

21. A cured polymeric material prepared by the process of claim 5.

22. A cured polymeric material prepared by the method of claim 2.

23. An article of manufacture in the form of a substrate having a coating of the cured polymeric material of claim 22.

24. The cured polymeric material of claim 22 in the form of a film.

25. The composition of claim 1 in which $R^1$ is alkyl.

26. The composition of claim 25 in which $R^1$ is methyl.

* * * * *